(12) United States Patent
Ganesh et al.

(10) Patent No.: US 12,075,933 B2
(45) Date of Patent: Sep. 3, 2024

(54) VOLUMETRIC MEASUREMENT BASED APPARATUS FOR DISPENSING SPICE

(71) Applicant: EUPHOTIC LABS PRIVATE LIMITED, Bengaluru (IN)

(72) Inventors: Abhishek Ganesh, Mumbai (IN); Yatinkumar Varachhia, Gujarat (IN); Khushal Patel, Gujarat (IN); Venkatesh Puttaswamy, Bengaluru (IN)

(73) Assignee: EUPHOTIC LABS PRIVATE LIMITED, Bengaluru (IN)

( * ) Notice: Subject to any disclaimer, the term of this patent is extended or adjusted under 35 U.S.C. 154(b) by 407 days.

(21) Appl. No.: 17/441,377

(22) PCT Filed: May 12, 2020

(86) PCT No.: PCT/IB2020/054464
§ 371 (c)(1),
(2) Date: Sep. 21, 2021

(87) PCT Pub. No.: WO2020/260967
PCT Pub. Date: Dec. 30, 2020

(65) Prior Publication Data
US 2022/0167768 A1  Jun. 2, 2022

(30) Foreign Application Priority Data

Jun. 28, 2019 (IN) .............................. 201941025979

(51) Int. Cl.
*A47G 19/34* (2006.01)
(52) U.S. Cl.
CPC .................................... *A47G 19/34* (2013.01)
(58) Field of Classification Search
CPC ................................... A47G 19/34; A47J 47/01
See application file for complete search history.

(56) References Cited

U.S. PATENT DOCUMENTS

| 2,706,585 A | * | 4/1955 | Bean | B65D 83/06 |
| | | | | 222/336 |
| 2,877,937 A | * | 3/1959 | Weir | B65D 5/76 |
| | | | | 229/5.5 |

(Continued)

FOREIGN PATENT DOCUMENTS

JP           H07187260 A  *  7/1995  .............. G01F 11/46

OTHER PUBLICATIONS

Corresponding International Patent Application No. PCT/IB2020/054464, International Search Report, mailed date Sep. 3, 2020.

(Continued)

*Primary Examiner* — Bob Zadeh
(74) *Attorney, Agent, or Firm* — Cooper Legal Group, LLC

(57) ABSTRACT

The present disclosure provides a volumetric measurement based apparatus for dispensing powdered spice. The apparatus comprises a storage section comprising a funnel shaped section with the narrowed part of the funnel towards the side of dispensation of powdered spice. The apparatus also comprises an outer hole that is misaligned with the first hole, and in between the two holes a lever is configured to slide, with the lever having a slot. The lever is coupled to any driving mechanism that enables angular motion of the lever. When the slot and the first hole are aligned, powdered spice flows from the first hole to the second hole. The lever can then move, and when the slot is aligned with the outer hole, the powdered spice is dispensed. The quantity of powdered spice dispensed is a function of amount of overlap of the holes.

7 Claims, 3 Drawing Sheets

(56) References Cited

U.S. PATENT DOCUMENTS

| | | | | |
|---|---|---|---|---|
| 3,129,853 A | * | 4/1964 | Hoskins | A47G 19/34 |
| | | | | 222/362 |
| 2009/0001101 A1 | * | 1/2009 | Zahradka | B65B 1/36 |
| | | | | 141/340 |
| 2013/0032611 A1 | * | 2/2013 | Dooley | A47J 31/401 |
| | | | | 222/145.5 |
| 2014/0144926 A1 | * | 5/2014 | Wolf | A47J 47/01 |
| | | | | 222/241 |

OTHER PUBLICATIONS

Corresponding International Patent Application No. PCT/IB2020/054464, Written Opinion of the International Searching Authority, mailed date Sep. 3, 2020.

Corresponding Indian Patent Application No. 201941025979, Office Action dated Jun. 17, 2020. English Translation.

* cited by examiner

VOLUMETRIC MEASUREMENT BASED APPARATUS FOR DISPENSING SPICE

TECHNICAL FIELD

The present disclosure relates generally to the field of material dispensing. In particular, the present disclosure relates to an apparatus for accurate dispensing of powdered spice based on volumetric measurement.

BACKGROUND

Background description includes information that may be useful in understanding the present invention. It is not an admission that any of the information provided herein is prior art or relevant to the presently claimed invention, or that any publication specifically or implicitly referenced is prior art.

Cooking automation is attaining great popularity in recent years. A robot is programmed with kitchen recipes from cookbooks, recipe cards, newspapers, and other sources and the robot reads the various ingredients and spices (types and amounts) required for the recipe. While ingredients, such as meats, vegetables, grains, fats and the like, are fairly straightforward to measure, spices require care, since even a small variation in the amount of spices used in the recipe can completely alter the taste of the recipe.

Typically, a weight-based mechanism for dispensing spices is a slow, expensive and complex procedure, which is undesirable. Further, especially in case of powdered spices, the Van der Waal forces of attraction between the particles of the powder can prevent proper sprinkling of the powder, causing an error in weight-based mechanisms.

There is, therefore, a requirement in the art for a means to dispense powdered spice that is accurate, economical and simple.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS

A general object of the present disclosure is to provide a volumetric measurement based apparatus for dispensing spice.

Another object of the present disclosure is to provide an apparatus capable of dispensing powdered spice.

Another object of the present disclosure is to provide an apparatus that can accurately dispense powdered spice.

Another object of the present disclosure is to provide an apparatus that is compact.

Another object of the present disclosure is to provide an apparatus that is economical.

SUMMARY

The present disclosure relates generally to the field of material dispensing. In particular, the present disclosure relates to an apparatus for accurate dispensing of powdered spice based on volumetric measurement.

In an aspect, the present disclosure provides an apparatus for dispensing powdered spice said apparatus comprising: a body with an inner cavity, said cavity being funnel shaped towards a dispensing end of the apparatus and configured to store the powdered spice; a first opening provided at narrow end of the funnel shaped part of the cavity; a lever provided with a slot, configured to slide angularly under the funnel shaped cavity in a lever space, said lever space being isolated from the funnel shaped cavity, wherein movement of the lever allows the slot to at least partially align with the first opening; a third opening provided on the body and opened to the outside, said third opening configured to be misaligned with the first opening, wherein movement of the lever allows the slot to at least partially align with the third opening; and a motion mechanism coupled to the lever and configured to provide motion to the lever, wherein, when the slot at least partially aligns with the first opening, at least a portion of the powdered spice is received by the slot in the lever, and wherein, when the lever moves from the location of the first opening towards the location of the third opening, the at least a portion of the powdered spice is carried by the lever to the third opening to dispense it from the body.

In an embodiment, a wheel is provided in the cavity, said wheel adapted to rotate during motion of the lever, wherein, during alignment of the first opening and the slot, the wheel rotates to push the powdered spice towards the first opening, and wherein, as the lever moves to shift the slot away from the third opening, the wheel rotates to push the powdered spice back into the cavity.

In another embodiment, the wheel is provided with a plurality of blades disposed on its periphery, wherein rotation of the wheel enables the plurality of blades to stir the powdered spice.

In another embodiment, the motion mechanism is coupled to the wheel to enable rotation of the wheel.

In another embodiment, a second motion mechanism is coupled to the wheel to enables rotation of the wheel.

In another embodiment, the motion mechanism is configured to control level of alignment of the first opening and the slot to enable a required quantity of powdered spice to be dispensed based on volumetric flow of the powdered spice.

In another embodiment, an input opening is provided on the body for loading powdered spice into the apparatus, said input hole coupled to the cavity.

In another embodiment, the motion mechanism is any or a combination of electrical, mechanical, hydraulic and pneumatic means.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present invention and are incorporated in and constitute a part of this specification. The drawings illustrate exemplary embodiments of the present invention and, together with the description, serve to explain the principles of the present invention.

DETAILED DESCRIPTION

Figure 1:
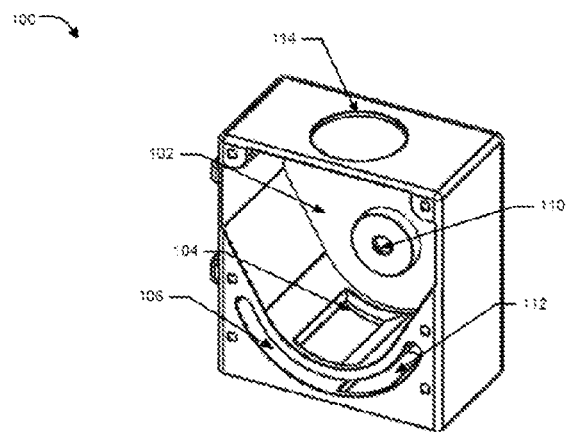
FIG. 1 illustrates an exemplary representation of front sectional view an apparatus to dispense powdered spice, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

In an aspect, the present disclosure provides a volumetric measurement based apparatus for dispensing powdered spice. The apparatus comprises a storage section comprising a funnel shaped section with the narrowed part of the funnel towards the side of dispensation of powdered spice. The apparatus also comprises an outer hole that is misaligned with the first hole, and in between the two holes a lever is configured to slide, with the lever having a slot. The lever is coupled to any driving mechanism that can enable angular motion of the lever. When the slot and the first hole are aligned, powdered spice flows from the first hole to the second hole. The lever can then move, and when the slot is aligned with the outer hole, the powdered spice is dispensed. The quantity of powdered spice dispensed is a function of amount of overlap of the holes.

FIG. 1 illustrates an exemplary representation of front sectional view an apparatus to dispense powdered spice, in accordance with an embodiment of the present disclosure. In an embodiment, the apparatus 100 comprises a storage section comprising a funnel shaped section 102 towards the dispensing side of the apparatus 100, with the narrowed part of the funnel towards the dispensing side of the apparatus 100. The funnel shape is adapted to guide the powdered spice towards the bottom of the apparatus during dispensing. In another embodiment, at the base of the funnel is a first hole 104 through which the powdered spice is collected in the lever.

In another embodiment, the apparatus 100 comprises a lever 106 adapted to slide under the funnel shaped section. The lever 106 comprises a slot 108 that moves as the lever 106 slides. The lever mechanism is such as to allow flow of powdered spice when the first hole 104 and the slot 108 are at least partially aligned and to prevent flow of powdered spice when the first hole 104 and the slot 108 are not aligned. The lever 106 acts as a door to the first hole 104.

In another embodiment, the lever 106 is coupled to a centre of the apparatus 100 such that it is coaxial to a hole 110 provided at the centre of the apparatus 100. The lever 106, through the hole 110, can be coupled to a rotary motion mechanism (not show in figure) such that, as rotation is provided at the centre, the lever 106 correspondingly slides under the funnel shaped section 102 by the same angle as the angle of rotation provided at the centre. It would be appreciated by persons skilled in the art that the angular motion of the lever can be enabled by any driving mechanism.

In another embodiment, the lever 106 can be configured to move linearly.

In another embodiment, the apparatus 100 is provided with an outer hole 112 that is misaligned with the first hole 104. The outer hole 112 is provided under the plane of motion of the lever 106 and the slot 108 is configured to at least partially align with the outer hole 112.

In another embodiment, the lever 106 is adapted to slide such that the slot 108 selectively aligns with either the first hole 104 or the outer hole 112. As the first hole 104 and the slot 108 align, the powdered spice is collected at the slot 108 of the lever 106. The lever 106 then moves with the slot 108 carrying the powdered spice and, as the slot 108 and outer hole 112 align, the carried powdered spice is dispensed.

In another embodiment, the amount of powdered spice dispensed is based on the amount of alignment of the slot 108 and the first hole 104. Larger overlap allows more powdered spice to flow.

In another embodiment, when the powdered spice is not being dispensed, the lever 106 is in a resting position where the slot 108 is at the dispensing position, i.e., it is aligned with the outer hole 112.

In another embodiment, the apparatus is provided with a hole 114 at the top towards the broad side of the funnel, the hole 114 being provided to add the powdered spice into the apparatus 100.

Figure 2:
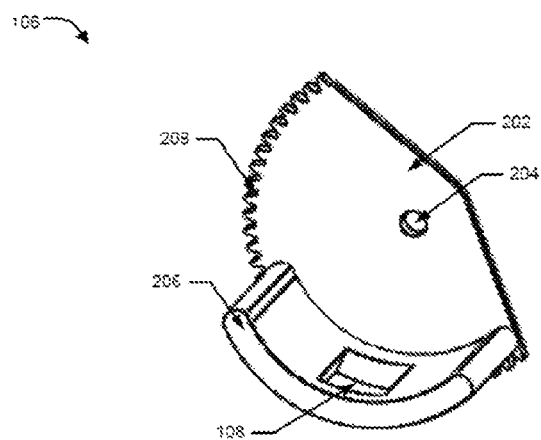
FIG. 2 illustrates an exemplary representation of the lever of the proposed apparatus, in accordance with an embodiment of the present disclosure.

FIG. 2 illustrates an exemplary representation of the lever of the proposed apparatus, in accordance with an embodiment of the present disclosure. In an embodiment, the lever 106 comprises a plate 202 with a hole 204 that is assembled into the apparatus 100 such that the hole 110 at the centre of the apparatus 100 and the hole 204 on the lever 106 as coaxial.

In another embodiment, the lever 106 is provided with a second plate 206 that is perpendicular to the first plate 202 and at a radial distance from the hole 204 so as to slide under the funnel shaped section 102 of the apparatus 100.

In another embodiment, the second plate 206 of the lever 106 is provided with the slot 108 such that, as the lever 106 moves, the slot 108, accordingly, either aligns with the first hole 104 or not, thereby either allowing or preventing flow of the powdered spice respectively.

In another embodiment, as the lever 106 moves, the slot 108 can at least partially align with the outer hole 112. In another embodiment, the lever 106 is adapted to slide such that the slot 108 selectively aligns with either the first hole 104 or the outer hole 112. As the first hole 104 and the slot 108 align, the powdered spice is collected by the slot 108 of the lever 106. The lever 106 then moves, carrying the powdered spice and, as the slot 108 and outer hole 112 align, the carried powdered spice is dispensed.

In another embodiment, the amount of powdered spice dispensed is based on the amount alignment of the slot 108 and the first hole 104. Larger overlap allows more powdered spice to flow.

In another embodiment, when the powdered spice is not being dispensed, the lever 106 is in a resting position where the slot 108 is at the dispensing position, i.e., it is aligned with the outer hole 112.

In another embodiment, the first plate 202 can be provided with a pinion section 208 on one side so as to be able to hold its position.

In another embodiment, the lever 106 can be coupled to a rotary motion mechanism (not shown in figure) through its hole 204 such that rotary motion at the hole 204 translates to an angular motion of the second plate 206.

In another embodiment, the rotary motion mechanism can be any or a combination of electrical, mechanical, hydraulic and pneumatic means.

Figure 3:
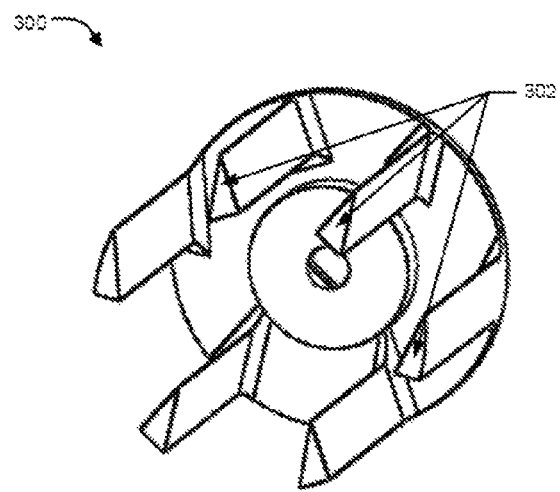
FIG. 3 illustrates an exemplary sectional view of a wheel in the proposed apparatus, in accordance with an embodiment of the present disclosure.

FIG. 3 illustrates an exemplary representation of a wheel in the proposed apparatus, in accordance with an embodiment of the present disclosure. In an embodiment, the wheel 300 is coaxial with the hole 110 at the centre of the apparatus 100 and is configured for the rotary motion mechanism (not shown in figure) such that, as the lever 106 rotes, the wheel 300 also rotates. The wheel 300 comprises blades 302 along its circumference and is configured to push powdered spice down towards the first hole 104 when they are aligned. In the absence of the wheel 300, the powdered spice falls sparingly through the first hole 104 owing to mutual attraction of the particles of the powdered spice by Van der Waal forces. As the slot 108 moves away from the first hole 104, the wheel 300 rotates to push the powdered spice away from the first hole 104.

In another embodiment, as the wheel 300 rotates, it further acts to shake the material.

It would be appreciated that the shape, size, number, orientation and other aspects of wheel configuration an be varied by modifications within the scope of the disclosure, to enable a similar function as described above.

Figure 4:
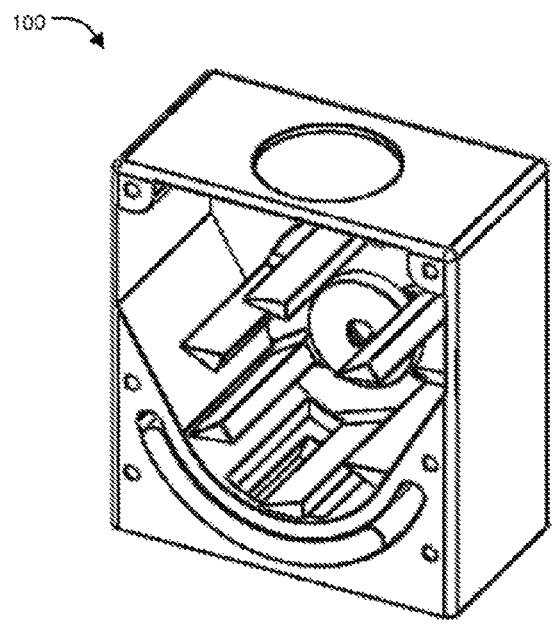
FIG. 4 illustrates an exemplary representation of the apparatus to dispense powdered spice, in accordance with an embodiment of the present disclosure.

FIG. 4 illustrates an exemplary representation of the apparatus to dispense powdered spice, in accordance with an embodiment of the present disclosure. In an embodiment, the apparatus 100 comprises a storage section comprising a funnel shaped section 102 with the narrowed part of the funnel towards the side of dispensation of powdered spice. The funnel shape is adapted to guide the powdered spice towards the bottom of the apparatus 100 during dispensing. In another embodiment, at the base of the funnel is a first hole 104 through which the powdered spice is dispensed.

In another embodiment, the apparatus 100 comprises a lever 106 adapted to slide under the funnel shaped section 102. The lever 106 comprises a slot 108 that moves as the lever 106 slides. The lever mechanism is such as to allow flow of powdered spice when the first hole 104 and the slot 108 are at least partially aligned and to prevent flow of powdered spice when the first hole 104 and the slot 108 are not aligned. The lever 106 acts as a door to the first hole 104.

In another embodiment, the lever 106 is coupled to a centre of the apparatus 100 such that it is coaxial to a hole 110 provided at the centre of the apparatus 100. The lever 106, through the hole 110, can be coupled to a rotary motion mechanism (not shown in figure) such that as rotation is provided at the centre, the lever 106 correspondingly slides under the funnel shaped section 102 by the same angle as the angle of rotation provided at the centre.

In another embodiment, the apparatus 100 is provided with an outer hole 112 that is misaligned with the first hole 104. The outer hole 112 is provided under the plane of motion of the lever 106 and the slot 108 is configured to at least partially align with the outer hole 112.

In another embodiment, the lever 106 is adapted to slide such that the slot 108 selectively aligns with either the first hole 104 or the outer hole 112. As the first hole 104 and the slot 108 align, the powdered spice is collected by the slot 108 of the lever 106. The lever 106 then moves, carrying the powdered spice and, as the slot 108 and outer hole 112 align, the carried powdered spice is dispensed.

In another embodiment, the amount of powdered spice dispensed is based on the alignment of the slot 108 and the first hole 104. Larger overlap allows more powdered spice to flow.

In another embodiment, when the powdered spice is not being dispensed, the lever 106 is in a resting position where the slot 108 is at the dispensing position, i.e., it is aligned with the outer hole 112.

In another embodiment, the apparatus 100 is provided with a hole 114 at the top towards the broad side of the funnel, the hole 114 being provided to add powdered spice into the apparatus 100.

In another embodiment, the wheel 300 is provided which is coaxial with the hole 110 at the centre of the apparatus 100 and is configured for the rotary motion mechanism (not shown in figure) such that, as the lever 106 rotes, the wheel 300 also rotates. The wheel 300 comprises blades 302 along its circumference and is configured to push powdered spice down towards the first hole 104 when the first hole 104 and the slot 108 are aligned. In the absence of the wheel 300, the powdered spice falls sparingly through the first hole 104 owing to mutual attraction of the particles of the powdered spice by Van der Waal forces. As the slot 108 moves away from the first hole 104, the wheel 300 rotates to push the powdered spice away from the first hole 104. In another embodiment, as the wheel 300 rotates, it further acts to shake the powdered spice.

Figure 5A:
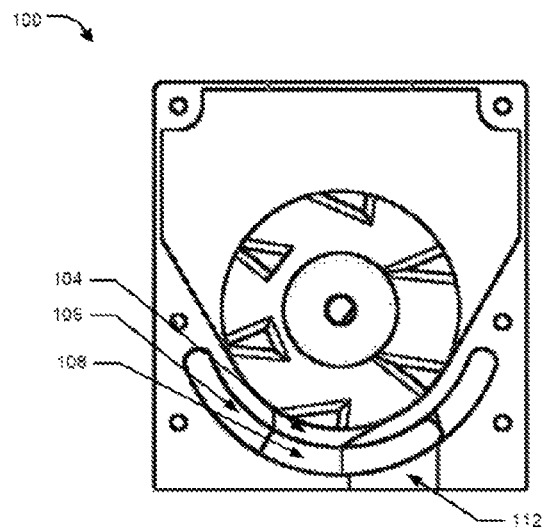
FIGS. 5A and 5B illustrate exemplary representations of the apparatus with the lever in collecting position and dispensing position respectively, in accordance with an embodiment of the present disclosure.
Figure 5B:
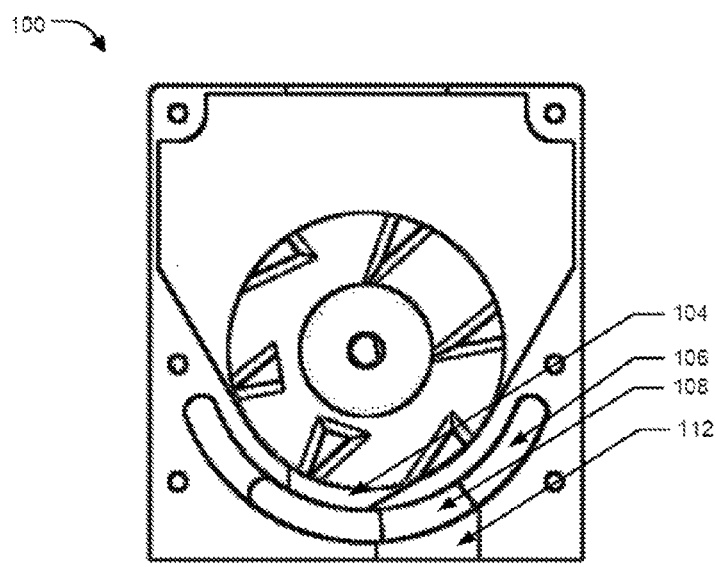

FIGS. 5A and 5B illustrate exemplary representations of the apparatus with the lever in collecting position and dispensing position respectively, in accordance with an embodiment of the present disclosure.

It should be apparent to those skilled in the art that many more modifications besides those already described are possible without departing from the inventive concepts herein. The inventive patient matter, therefore, is not to be restricted except in the spirit of the appended claims. Moreover, in interpreting both the specification and the claims, all terms should be interpreted in the broadest possible manner consistent with the context. In particular, the terms "includes" and "including" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practised with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES

The present disclosure provides a volumetric measurement based apparatus for dispensing spice.

The present disclosure provides an apparatus capable of dispensing powdered spice.

The present disclosure provides an apparatus that can accurately dispense powdered spice.

The present disclosure provides an apparatus that is compact.

The present disclosure provides an apparatus that is economical.

We claim:

1. An apparatus for dispensing powdered spice, the apparatus comprising:
 a body with an inner cavity, the inner cavity being funnel shaped towards a dispensing end of the apparatus and configured to store the powdered spice;
 a first hole provided at a narrow end of the inner cavity;
 a lever provided with a slot, the lever configured to slide angularly under the inner cavity in a lever space, the lever space being isolated from the inner cavity, wherein movement of the lever allows the slot to at least partially align with the first hole;
 an outer hole provided on the body, the outer hole configured to be misaligned with the first hole, wherein movement of the lever allows the slot to at least partially align with the outer hole; and
 a motion mechanism coupled to the lever and configured to provide motion to the lever,
 wherein, when the slot at least partially aligns with the first hole, at least a portion of the powdered spice is received by the slot in the lever, wherein, when the lever moves from a location of the first hole towards a location of outer hole, at least a portion of the powdered spice is carried by the lever to the outer hole to dispense the powdered spice from the body, and wherein the motion mechanism is configured to control an extent of alignment of the first hole and the slot by controlling the movement of the lever to enable a specified quantity of the powdered spice to be dispensed.

2. The apparatus as claimed in claim 1, wherein a wheel is provided in the inner cavity, the wheel adapted to rotate during the motion of the lever, wherein, during the alignment of the first hole and the slot, the wheel rotates to push the powdered spice towards the first hole, and wherein, as the lever moves to shift the slot away from the outer hole, the wheel rotates to shake the powdered spice and push the powdered spice back into the inner cavity.

3. The apparatus as claimed in claim 2, wherein the wheel is provided with a plurality of blades, wherein rotation of the wheel enables the plurality of blades to stir and shake the powdered spice.

4. The apparatus as claimed in claim 2, wherein the motion mechanism is coupled to the wheel to enable rotation of the wheel.

5. The apparatus as claimed in claim 2, wherein a second motion mechanism is coupled to the wheel to enable rotation of the wheel.

6. The apparatus as claimed in claim 1, wherein an input opening hole is provided on the body for loading the powdered spice into the apparatus, the input opening hole coupled to the inner cavity.

7. The apparatus as claimed in claim 1, wherein the motion mechanism is any or a combination of electrical, mechanical, hydraulic and pneumatic means.

\* \* \* \* \*